United States Patent
Crowe et al.

(10) Patent No.: US 11,288,863 B2
(45) Date of Patent: Mar. 29, 2022

(54) VOXEL BUILD

(71) Applicant: Intuitive Research and Technology Corporation, Huntsville, AL (US)

(72) Inventors: Chanler Crowe, Madison, AL (US); Michael Jones, Athens, AL (US); Kyle Russell, Huntsville, AL (US); Michael Yohe, Meridianville, AL (US)

(73) Assignee: INTUITIVE RESEARCH AND TECHNOLOGY CORPORATION, Huntsville, AL (US)

( * ) Notice: Subject to any disclaimer, the term of this patent is extended or adjusted under 35 U.S.C. 154(b) by 0 days.

(21) Appl. No.: 16/428,372

(22) Filed: May 31, 2019

(65) Prior Publication Data

US 2020/0175755 A1    Jun. 4, 2020

Related U.S. Application Data

(60) Provisional application No. 62/774,960, filed on Dec. 4, 2018.

(51) Int. Cl.
| | |
|---|---|
| G06T 17/20 | (2006.01) |
| G06T 15/08 | (2011.01) |
| G06T 7/90 | (2017.01) |
| G06T 7/70 | (2017.01) |

(52) U.S. Cl.
CPC .............. *G06T 17/20* (2013.01); *G06T 7/70* (2017.01); *G06T 7/90* (2017.01); *G06T 15/08* (2013.01); *G06T 2200/24* (2013.01); *G06T 2207/20092* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 6,990,228 B1 | 1/2006 | Wiles et al. | |
| 7,286,128 B2 | 10/2007 | Hall et al. | |
| 10,157,467 B2 | 12/2018 | Dincer et al. | |
| 2009/0074271 A1* | 3/2009 | Nakamura | H04N 1/4097 382/128 |
| 2010/0156901 A1* | 6/2010 | Park | G06T 15/205 345/420 |
| 2017/0039711 A1* | 2/2017 | Dincer | G06T 7/136 |
| 2017/0164928 A1* | 6/2017 | Oh | A61B 8/463 |
| 2017/0319147 A1* | 11/2017 | Wang | A61F 2/958 |
| 2018/0189565 A1 | 7/2018 | Lukierski et al. | |
| 2019/0026935 A1 | 1/2019 | Podziemski et al. | |
| 2020/0054398 A1* | 2/2020 | Kovtun | G06T 19/20 |

FOREIGN PATENT DOCUMENTS

| | | |
|---|---|---|
| WO | 2017070000 A1 | 4/2017 |
| WO | 2018015952 A1 | 1/2018 |
| WO | 2018088965 A1 | 5/2018 |
| WO | 2019008222 A1 | 1/2019 |

* cited by examiner

*Primary Examiner* — Peter Hoang
(74) *Attorney, Agent, or Firm* — Angela Holt; Frank M. Caprio; Bradley Arant Boult Cummings LLP

(57) ABSTRACT

A computer-implemented method that allows users evaluate the densities of images and search for abnormalities in three-dimensional space. The voxel buildup uses a series of two-dimensional images and evaluates every pixel based on the user described predetermined threshold value at runtime. Once all the voxels are created, the user may manipulate the set of voxels as if they are one mesh.

15 Claims, 5 Drawing Sheets

VOXEL BUILD

REFERENCE TO RELATED APPLICATIONS

This application claims priority to Provisional Patent Application U.S. Ser. No. 62/774,960, entitled "Voxel Build" and filed on Dec. 4, 2018, which is fully incorporated herein by reference.

BACKGROUND AND SUMMARY

The invention relates to an image-generation method for two-dimensional images. In this context, a voxel is to be understood to mean a volume element in the three-dimensional examination zone and a pixel is an image element of the two-dimensional image. A voxel image value is assigned a numerical value that characterizes a physical quantity in the relevant voxel.

The state of the art systems typically require a time consuming and repetitive process before yielding results. The current disclosure solves this problem by using two-dimensional images loaded into a three-dimensional mesh generating program. The mesh generating program creates a three-dimensional mesh based on two-dimensional images input into the program and the user described predetermined threshold value. Once the mesh is generated, the user can load the mesh into virtual space for evaluation at runtime.

Under the current invention, users can easily see a set of correlated two-dimensional and three-dimensional images to evaluate their densities (bone density, for example) and search for abnormalities in three-dimensional space. The described invention takes in a series of two-dimensional images and evaluates every pixel based on the user described predetermined threshold value at runtime. If the program meets the user described predetermined thresholds, the pixel is flagged. Once every pixel is evaluated, the current disclosure reads the locations of the flagged pixels and maps them in three-dimensional space. For each location, a small mesh, or voxel, is created, which represents the flagged pixel. Once all the voxels are created, the user may manipulate the set of voxels as if they are one mesh.

BRIEF DESCRIPTION OF THE DRAWINGS

The features and advantages of the examples of the present invention described herein will become apparent to those skilled in the art by reference to the accompanying drawings.

DETAILED DESCRIPTION

In some embodiments of the present disclosure, the operator may use the described method to create a three-dimensional mesh from two-dimensional data. As used herein, the term "XR" is used to describe Virtual Reality, Augmented Reality, or Mixed Reality displays and associated software-based environments. As used herein, "mesh" is used to describe a three-dimensional object in a virtual world, including, but not limited to, systems, assemblies, subassemblies, cabling, piping, landscapes, avatars, molecules, proteins, ligands, or chemical compounds. As used herein, "voxel" is used to describe a value on a regular grid in three-dimensional space. The position of the voxel is determined by the software by the location of the pixels over a user-determined threshold.

Figure 1:
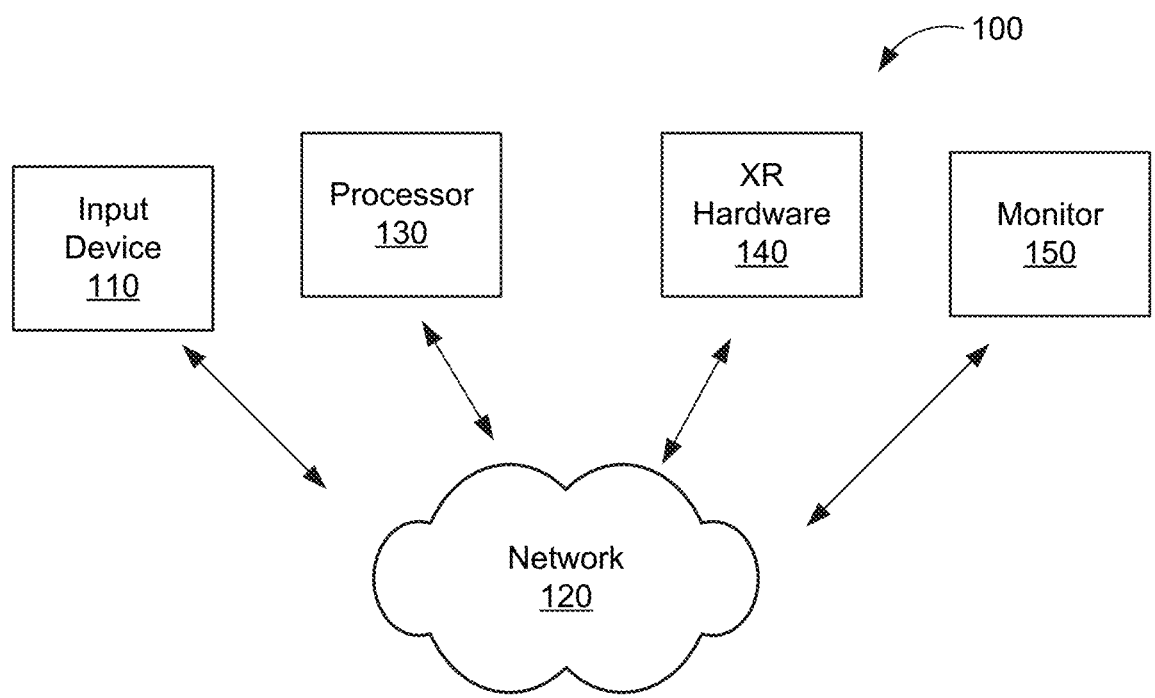
FIG. 1 is a flow diagram depicting a system for mapping two-dimensional and three-dimensional images according to an exemplary embodiment of the present disclosure.

FIG. 1 depicts a system 100 for supporting two-dimensional to three-dimensional spatial mapping (not shown), according to an exemplary embodiment of the present disclosure. The system 100 comprises an input device 110 communicating across a network 120 to a computer 130. The input device 110 may comprise, for example, a keyboard, a switch, a mouse, a joystick, a touch pad and/or other type of interface, which can be used to input data from a user (not shown) of the system 100. The network 120 may be a combination of hardware, software, or both. The system 100 further comprises XR hardware 140, which may be virtual or mixed reality hardware that can be used to visualize a three-dimensional world. The system 100 further comprises a video monitor 150 is used to display the three-dimensional data to the user. In operation of the system 100, the input device 110 receives input from the computer 130 and translates that input into an XR event or function call. The input device 110 allows a user to input data to the system 100, by translating user commands into computer commands.

Figure 2:
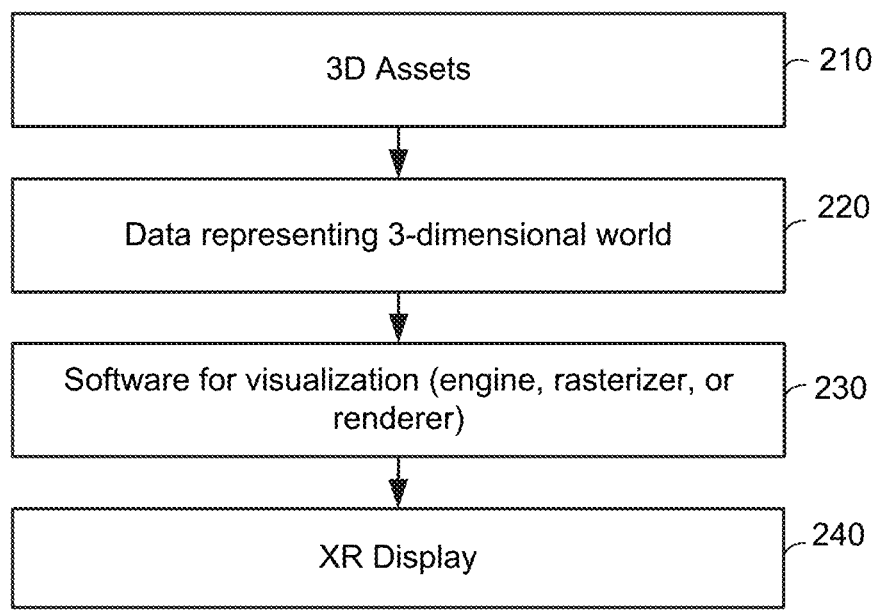
FIG. 2 is a flow diagram depicting a system for representing data in three-dimensional images, according to one embodiment of the present disclosure.

FIG. 2 illustrates the relationship between three-dimensional assets, the data representing those assets, and the communication between that data and the software, which leads to the representation on the XR platform. Three dimensional assets 210 may be any three-dimensional assets, which are any set of points that define geometry in three-dimensional space. The data representing a three-dimensional world 220 is a three-dimensional mesh that may be generated by importing three dimensional models, images representing two-dimensional data, or other data converted into a three-dimensional format. The software for visualization 230 of the data representing a three-dimensional world 220 allows for the processor 130 (FIG. 1) to facilitate the visualization of the data representing a three-dimensional world 220 to be depicted as three-dimensional assets 210 in the XR display 240.

Figure 3:
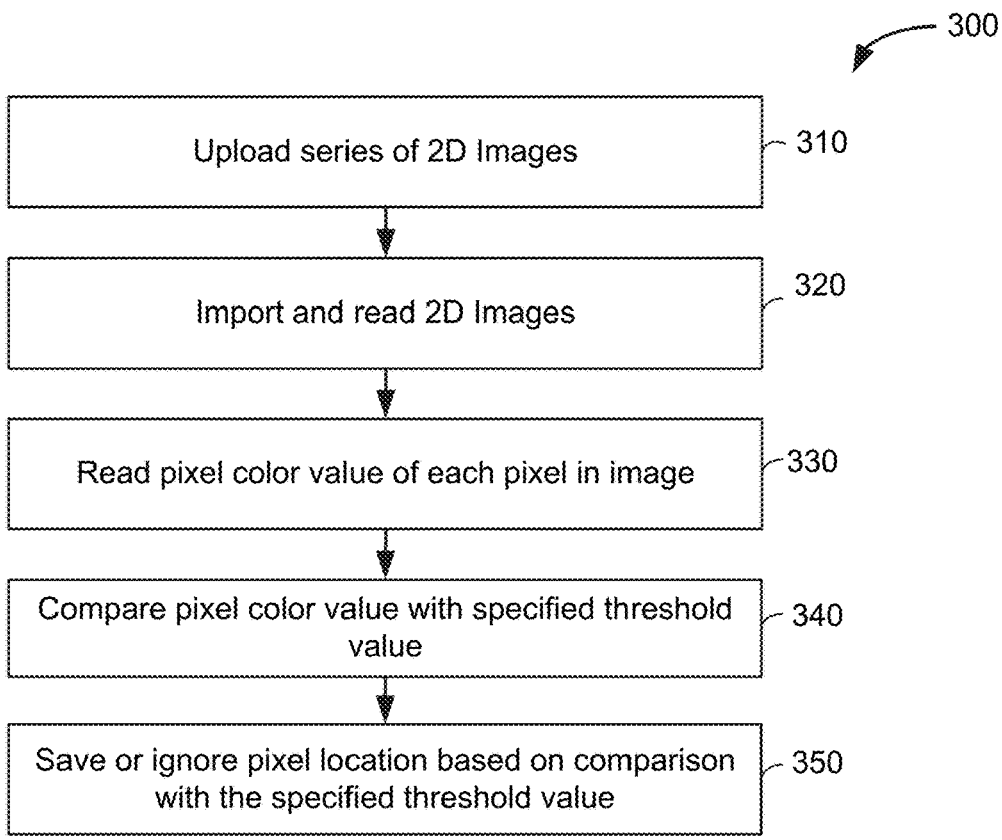
FIG. 3 is a flow diagram depicting the data importation and manipulation process performed by the software.

FIG. 3 depicts a method 300 for importing and analyzing data according to a threshold or range of values, in accordance with an exemplary embodiment of the present disclosure. In step 310, the user uploads a series of two-dimensional images to create a three-dimensional mesh. This can be done through a graphical user interface, copying the files into a designated folder, or another upload method. In step 320, the processor imports the two-dimensional images. In step 330, the software loops through the rows and columns of each two-dimensional image and evaluates each pixel and reads the color values of each pixel. In step 340, the software compares each individual pixel color value for the image against a specified threshold value. The threshold value can be user-defined or computer-generated. In step 350, the software saves and tracks the location of pixels with a color value above the specified threshold, or within a range of values. Pixels outside of the desired threshold are ignored, i.e., are not further tracked or displayed. The pixels may be saved in a variety of ways, such as: an array associated with a certain image, a text file, or other save methods.

Figure 4:
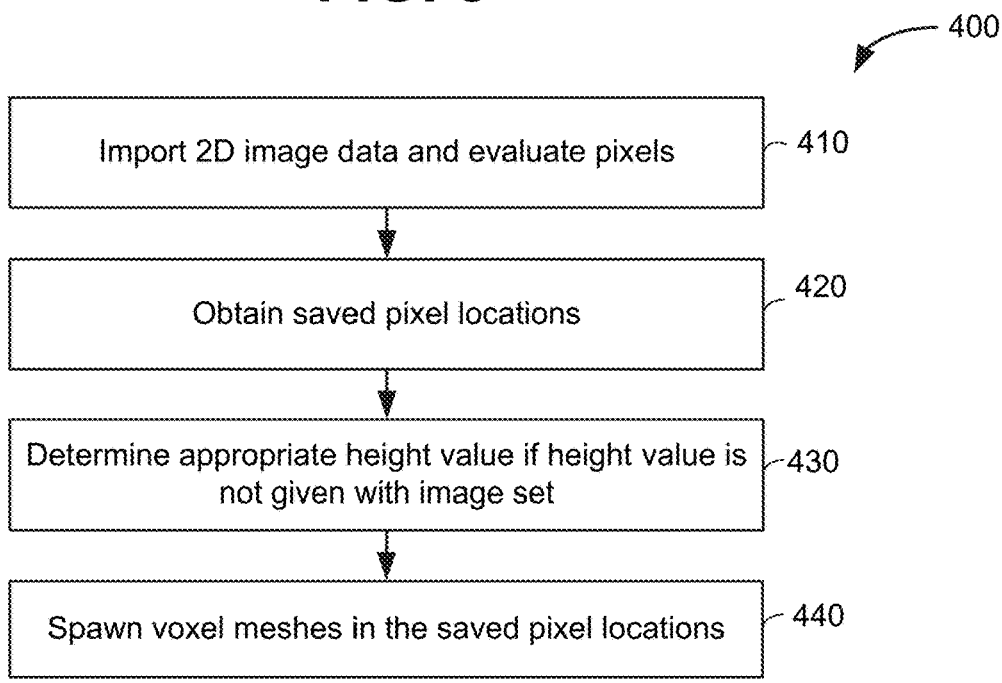
FIG. 4 is flow diagram depicting the creation of the voxel representing the series of images.

FIG. 4 depicts a method 400 of creating the voxel representation of the uploaded series of images according to an exemplary embodiment of the present disclosure. Step 410 shows the method 300 (FIG. 3) in the context of pixel creation. The software receives each of the saved pixel locations 420. In step 430, the software evaluates the height value of a vector's location. Two-dimensional images only have locations on two planes. In this example, those directions are defined as "x" and "y," but they can be any combination of planes in three-dimensional space. If the two-dimensional image does not supply the third value, in this example "z," the software will determine the third value either by user-specified increments or computer-generated increments. If the two-dimensional image supplies its own third value, then the software uses it. For example, medical images provide the third value in their header files. If no height value is given, the software determines the appropriate height value, either by user-defined increments or a default increment.

In step 440, the software spawns a voxel mesh at the three-dimensional location. In this example, the software does this by adding an instance to a hierarchical instanced mesh at the location provided. Once the spawning is complete, the voxel buildup (a three-dimensional model) is ready to be viewed and examined. The user may manipulate the set of voxels as if they are one mesh.

Viewing the to-scale three-dimensional model that is the result of the method 400 enables the user to examine the data with more dimension, allowing the user to see things they may have missed when viewing the data in only two dimensions.

Figure 5:
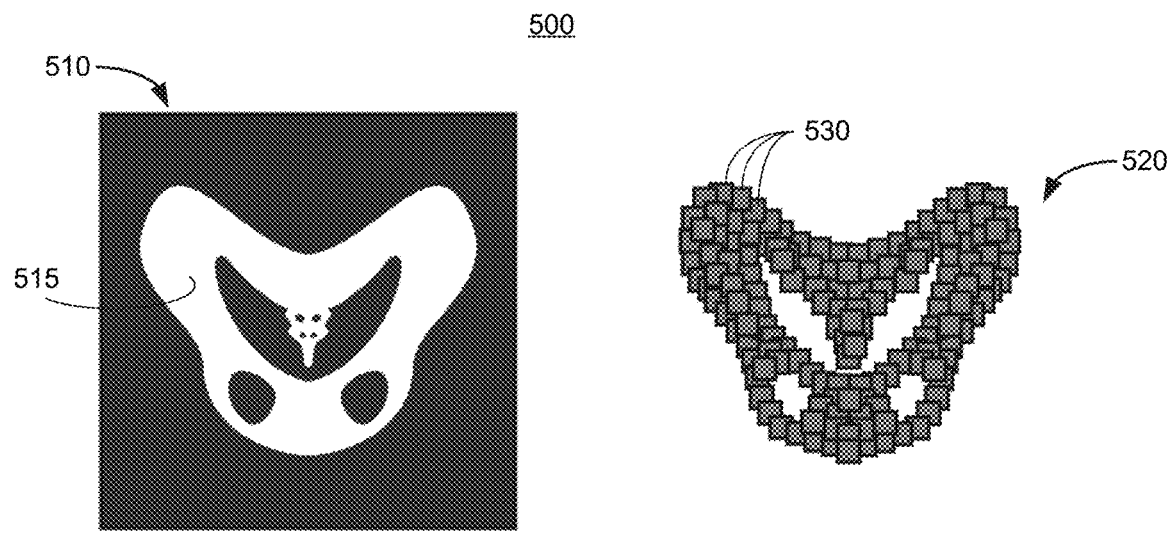
FIG. 5 depicts a display depicting a two-dimensional image and a three-dimensional image comprised of a plurality of voxels.

FIG. 5 depicts a display 500 as viewed by a user, the display 500 depicting a two-dimensional image 510 and a corresponding three-dimensional voxel mesh 520 comprised of a plurality of voxels 530. The white areas 515 of two-dimensional image 510 (which is an image of a human pelvis, in this example) is comprised of pixels (not shown). The three-dimensional voxel mesh 520 corresponds with the two-dimensional image 510. In this regard, each pixel in image 510 has a corresponding voxel 530 in the three-dimensional mesh 520. Although the voxels 530 are depicted in FIG. 5 as squares, they are actually cubes (i.e., three-dimensional).

Color gradations (not shown) in the two-dimensional image 510 indicate how dense the bone tissue depicted in the example is. Each voxel 530 is a single uniform colored three-dimensional cube, and together the voxels 530 form the mesh 520. The user can rotate the mesh 520 to further examine the three-dimensional image.

Figure 6:
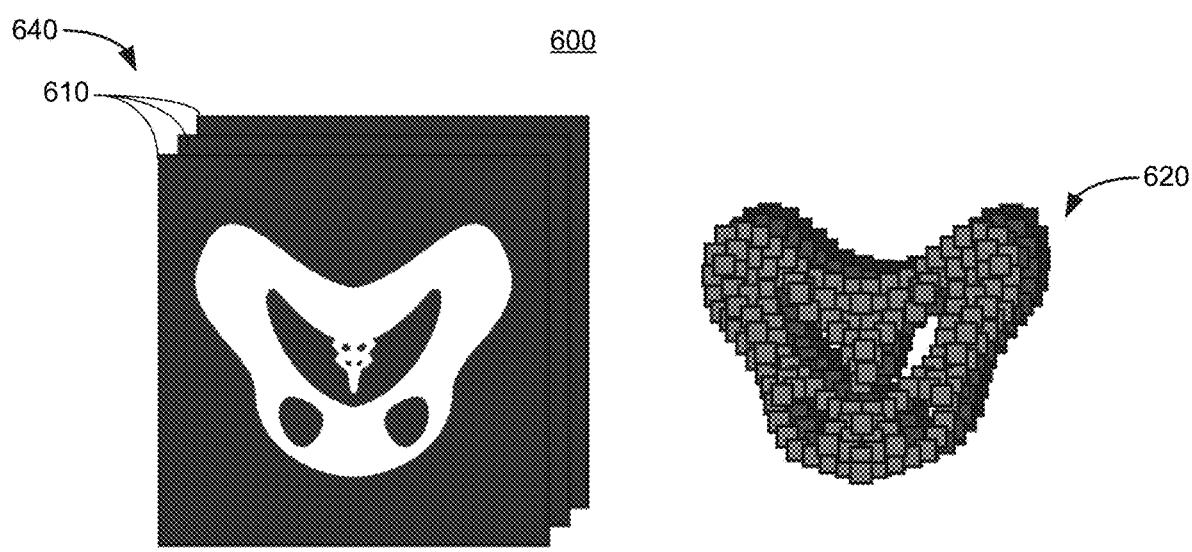
FIG. 6 depicts a display of a set of two-dimensional images and a correlating three-dimensional voxel mesh.

FIG. 6 depicts a display 600 according to an embodiment of the present disclosure, in which a user has uploaded a set 640 of two-dimensional images 610. Using the methods disclosed herein, a three-dimensional voxel mesh 620 is formed from the set 640 of two-dimensional images 610.

Figure 7:
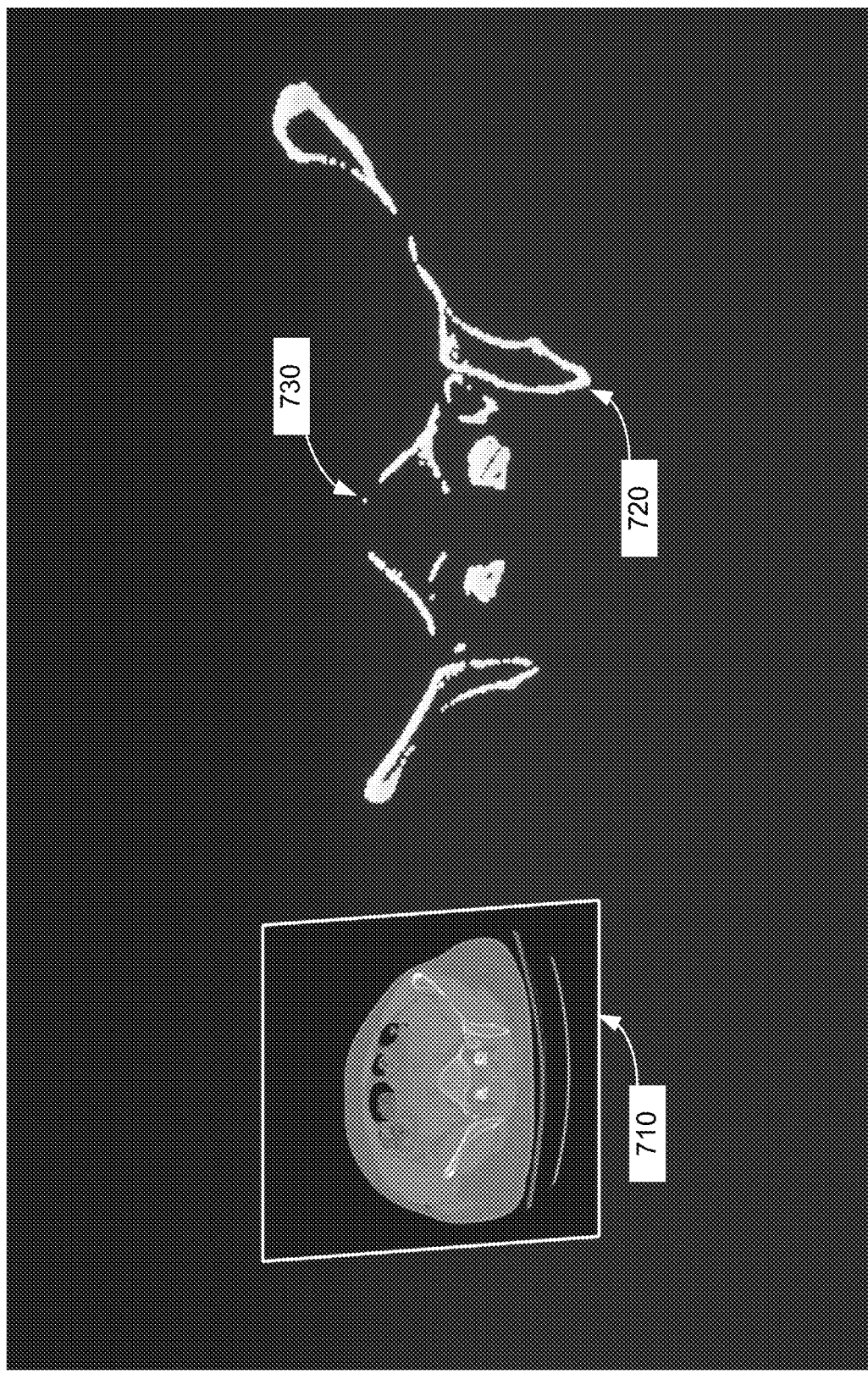
FIG. 7 is an exemplary display showing a single two-dimensional image and a corresponding three-dimensional voxel mesh.

FIG. 7 depicts an exemplary display 700 as viewed by a user, the display 700 depicting a two-dimensional image 710 and a corresponding three-dimensional voxel mesh 720 comprised of a plurality of voxels 730. The three-dimensional voxel mesh 720 corresponds with the two-dimensional image 710. In this regard, each pixel in image 710 has a corresponding voxel 730 in the three-dimensional mesh 720. Although the voxels 730 are depicted in FIG. 7 as squares, they are actually cubes (i.e., three-dimensional).

Figure 8:
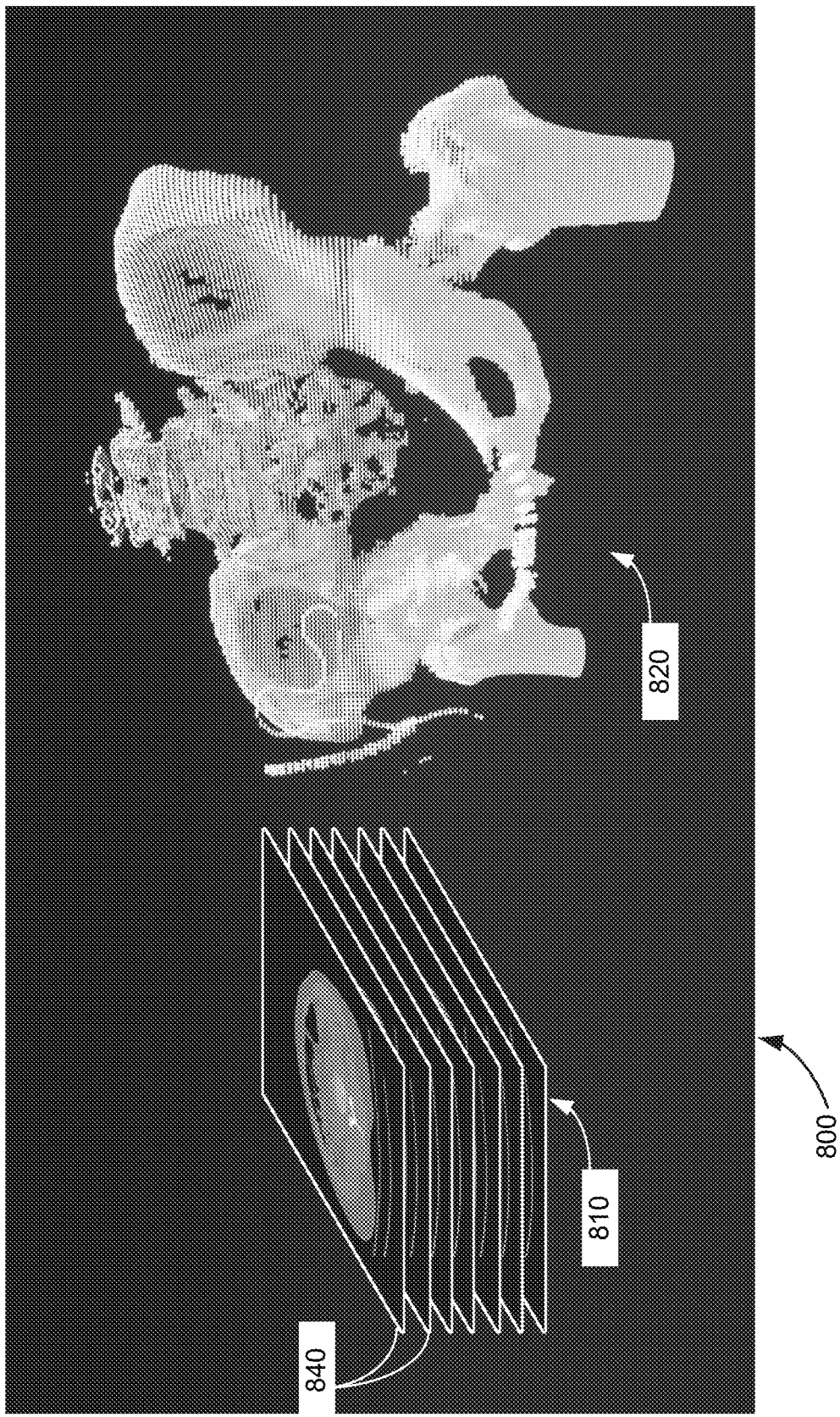
FIG. 8 is an exemplary display showing a set of two-dimensional images and a corresponding three-dimensional voxel mesh.

FIG. 8 depicts a display 800 according to an embodiment of the present disclosure, in which a user has uploaded a set 840 of two-dimensional images 810. Using the methods disclosed herein, a three-dimensional voxel mesh 820 is formed from the set 840 of two-dimensional images 810.

What is claimed is:

1. A method for creation of three-dimensional mesh capable of evaluation and manipulation within a virtual reality space, comprising:
   uploading one or more two-dimensional images, the two-dimensional images comprising pixels;
   evaluating the pixels based on user-described predetermined threshold values at runtime by looping through rows and columns of the image and obtaining color values for each pixel, comparing each pixel's color against the predetermined threshold values, and saving the location of pixels with a color value above the predetermined threshold;
   flagging pixels that meet the user-described predetermined threshold values;
   determining a height value associated with each flagged pixel to define a vector location;
   saving locations of the flagged pixels;
   mapping the flagged pixels in three-dimensional space using the vector locations; and
   displaying the flagged pixels in three-dimensions within the virtual reality space by spawning a three-dimensional shape at each flagged pixel location within the virtual reality space to form a three-dimensional object from the two-dimensional images.

2. The method of claim 1, wherein the predetermined threshold color is user-defined.

3. The method of claim 1, wherein the predetermined threshold color is determined by a processor.

4. The method of claim 1, wherein the predetermined threshold values comprise a range of values, and the evaluation of the pixels determines whether each pixel is within the range.

5. The method of claim 1, wherein the step of saving the location of pixels with a color value above the predetermined threshold comprises saving the pixels in an array associated with an image.

6. The method of claim 1, wherein the step of saving the location of pixels with a color value above the predetermined threshold comprises saving the pixels in a text file.

7. The method of claim 1, the three-dimensional object comprising a voxel mesh.

8. The method of claim 7, wherein each voxel of the voxel mesh correlates with a pixel of the two-dimensional image.

9. The method of claim 8, wherein the one or more two-dimensional images comprises a set of two-dimensional images which is displayed within the virtual reality space along with a three-dimensional voxel mesh representing the set.

10. The method of claim 7, further comprising manipulating the voxel mesh within the virtual reality space.

11. A method for creation of three-dimensional mesh capable of evaluation and manipulation within an extended reality space, comprising:
   uploading one or more two-dimensional images, the two-dimensional images comprising pixels;

evaluating the pixels based on a user-described predetermined threshold values at runtime by looping through rows and columns of the image and obtaining color values for each pixel, comparing each pixel's color against the predetermined threshold values, and saving the location of pixels with a color value above the predetermined threshold;

flagging pixels that meet the user-described predetermined threshold values;

determining a height value associated with each flagged pixel to define a vector location;

saving locations of the flagged pixels;

mapping the flagged pixels in three-dimensional space using the vector locations; and displaying the flagged pixels in three-dimensions within the extended reality space by spawning a three-dimensional shape at each flagged pixel location within the extended reality space to form a three-dimensional object from the two-dimensional images.

12. The method of claim 11, further comprising manipulating the voxel mesh within the extended reality space.

13. The method of claim 12, wherein the extended reality space comprises a virtual reality space.

14. The method of claim 12, wherein the extended reality space comprises an augmented reality space.

15. The method of claim 12, wherein the extended reality space comprises a mixed reality space.

* * * * *